United States Patent [19]

Murphy et al.

[11] Patent Number: 5,177,787
[45] Date of Patent: Jan. 5, 1993

[54] SCRAMBLER WITH SELF-CALIBRATION

[75] Inventors: William T. Murphy, Duluth; James Farmer, Lilburn; Lamar West, Jr., Maysville, all of Ga.

[73] Assignee: Scientific-Atlanta, Inc, Atlanta, Ga.

[21] Appl. No.: 771,851

[22] Filed: Oct. 7, 1991

Related U.S. Application Data

[63] Continuation of Ser. No. 345,240, May 1, 1989, abandoned.

[51] Int. Cl.$^5$ ............................................. H04N 7/167
[52] U.S. Cl. ........................................ 380/17; 380/15; 358/178
[58] Field of Search ............................ 380/15, 17, 20; 358/147, 171, 172, 176, 178, 177

[56] References Cited

U.S. PATENT DOCUMENTS

| | | |
|---|---|---|
| 2,691,061 | 10/1954 | Crotty et al. . |
| 2,705,740 | 4/1955 | Druz . |
| 3,081,376 | 3/1963 | Loughlin et al. . |
| 3,184,537 | 5/1965 | Court et al. . |
| 3,439,113 | 4/1969 | Walker . |
| 3,459,113 | 4/1969 | Walker ................................. 380/15 |
| 3,460,161 | 8/1969 | Waller et al. . |
| 3,824,332 | 7/1974 | Horowitz . |
| 4,075,660 | 2/1978 | Horowitz . |
| 4,095,258 | 6/1978 | Sperber . |
| 4,222,068 | 9/1980 | Thompson . |
| 4,257,065 | 3/1981 | Papay . |
| 4,336,553 | 6/1982 | den Toonder et al. . |
| 4,396,947 | 8/1983 | Cheung . |
| 4,400,732 | 8/1983 | Watanabe et al. . |
| 4,454,544 | 6/1984 | Abbott . |
| 4,458,268 | 7/1984 | Cicora ................................. 380/15 |
| 4,467,353 | 8/1984 | Cirta et al. ........................... 380/15 |
| 4,471,380 | 9/1984 | Mobley . |
| 4,511,919 | 4/1985 | Forgey et al. . |
| 4,551,767 | 11/1985 | Higashiguchi et al. . |
| 4,562,465 | 12/1985 | Glaab ................................... 380/15 |
| 4,568,974 | 2/1986 | den Toonder et al. . |
| 4,575,755 | 3/1986 | Schoeneberger et al. . |
| 4,598,318 | 7/1986 | Robbins . |
| 4,613,902 | 9/1986 | Ohmori . |
| 4,628,358 | 12/1986 | Robbins . |
| 4,631,603 | 12/1986 | Ryan ................................... 380/15 |
| 4,679,078 | 7/1987 | Wong et al. .......................... 380/15 |
| 4,682,360 | 7/1987 | Frederikspneial ..................... 380/15 |
| 4,695,901 | 9/1987 | Ryan ................................... 380/15 |
| 4,716,588 | 12/1987 | Thompson et al. ................... 380/15 |
| 4,888,799 | 12/1989 | Mobley et al. ....................... 380/15 |

FOREIGN PATENT DOCUMENTS 1016647 8/1977 Canada .
127125 12/1984 European Pat. Off. .

OTHER PUBLICATIONS

"Scrambling and Descrambling Equipment" by D. E. Kent, Director of Engineering, Jerrold International Division, General Instrument (UK) Ltd. pp. 025454-025461.

*Primary Examiner*—Tod R. Swann
*Attorney, Agent, or Firm*—William A. Powers; Frederick W. Powers, III

[57] ABSTRACT

The invention is directed to an improved scrambler capable of self-calibrating output signals. In one embodiment, the scrambler provides an encoded signal along separate signal pulses. A portion of one signal is made to correspond to a portion of another signal to thereby self-calibrate the signals. Also, portions of the incoming video signal are forced to correspond with internally generated voltage level signals.

15 Claims, 14 Drawing Sheets

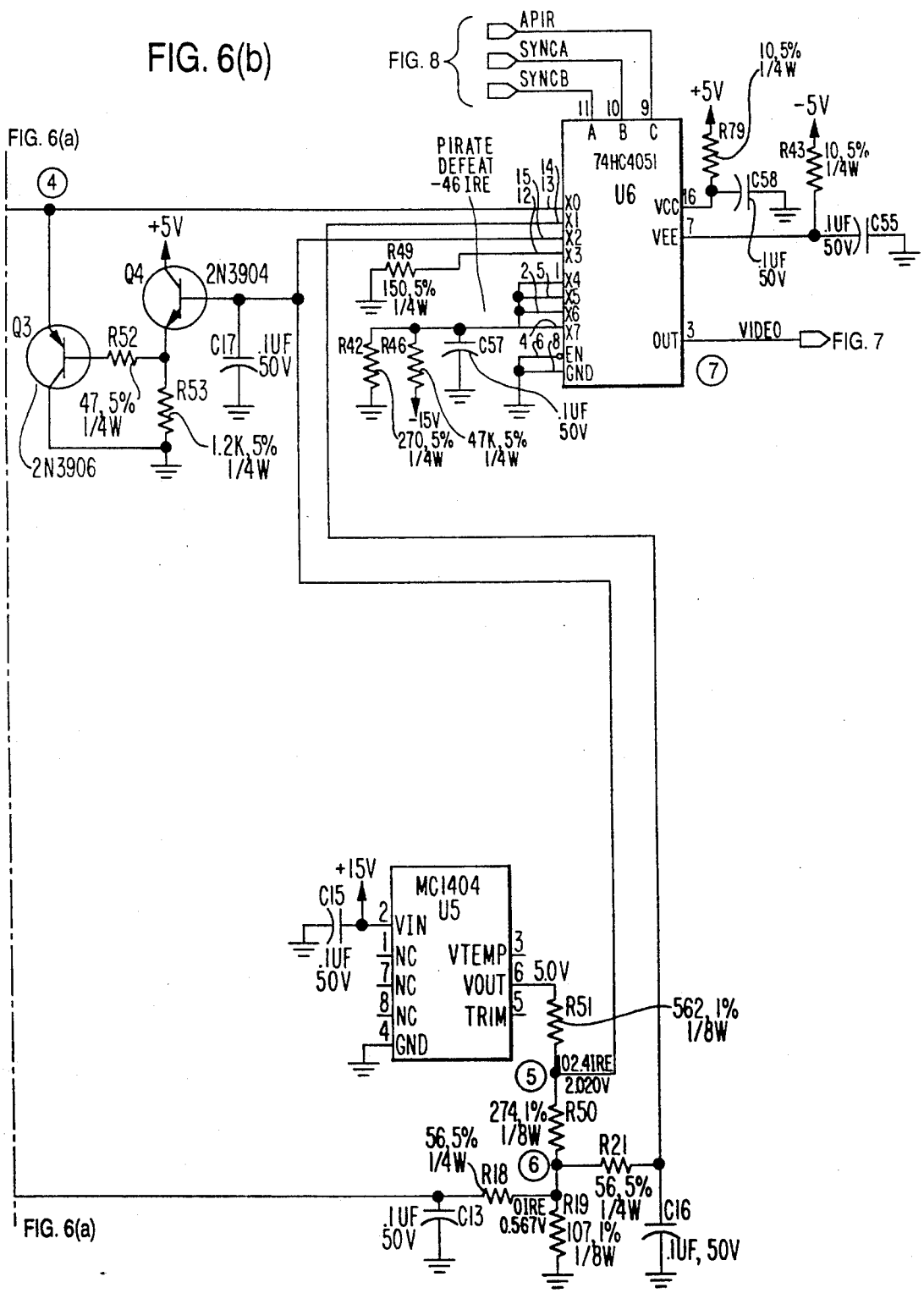

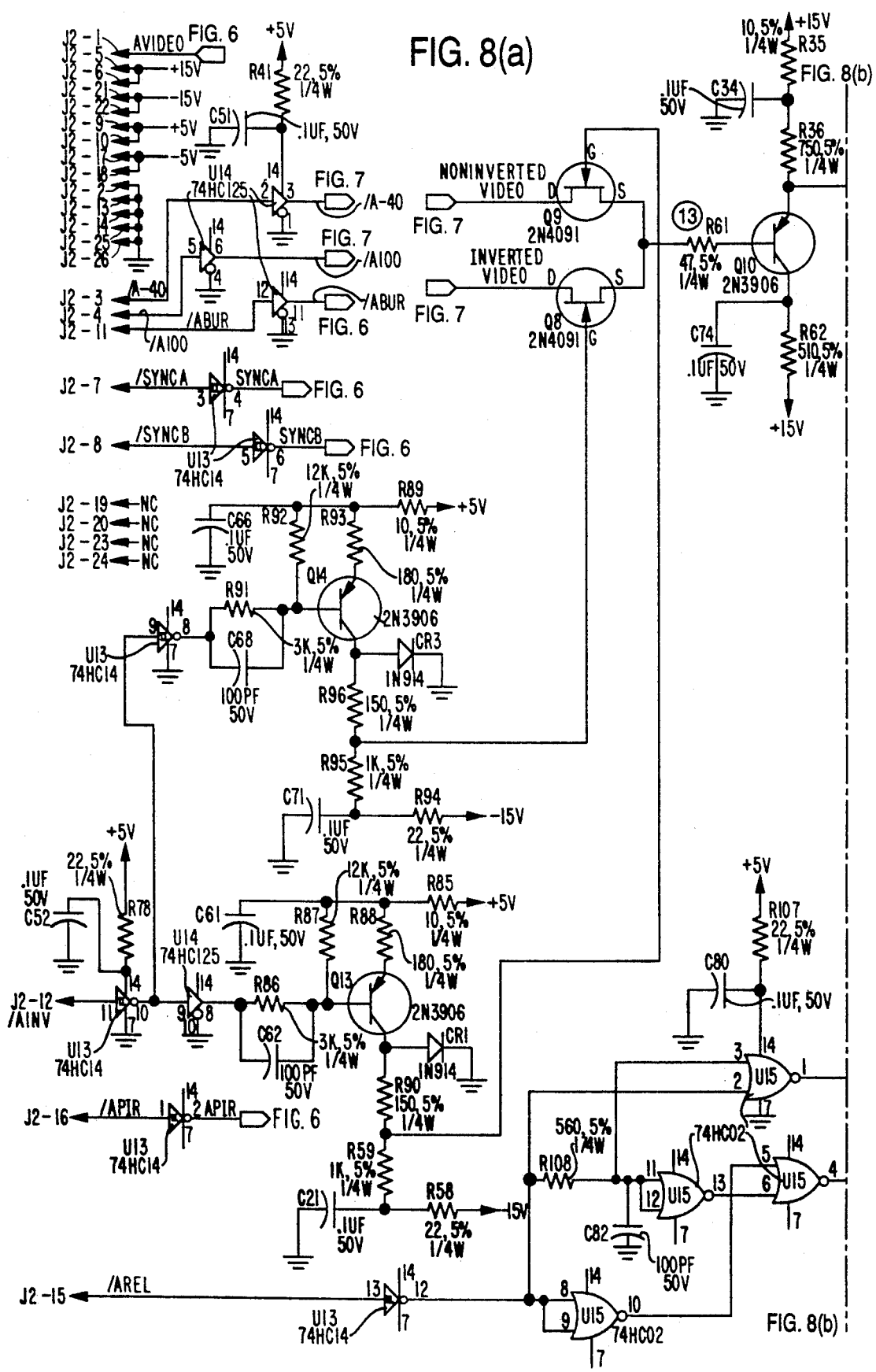

RING ELIMINATOR

SCRAMBLER WITH SELF-CALIBRATION

This application is a continuation of application Ser. No. 345,240, filed May 1, 1989, now abandoned.

RELATED APPLICATIONS

This application is related to commonly owned copending application Ser. No. 188,480, filed Apr. 29, 1988, now U.S. Pat. No. 4,924,498 which is hereby incorporated in its entirety by this reference thereto.

BACKGROUND OF THE INVENTION

This invention relates generally to an improved scrambling apparatus or encoder for self calibrating a selectively scrambled or encoded video signal. Currently, several techniques are known for scrambling a video signal. These techniques include, but are not limited to, selective inversion of at least a portion of the video signal, selective synchronization (sync) suppression and/or generation of split sync pulses. Typically, the sync pulse comprises a single pulse between the front and back porch characterized by a single voltage level for substantially the entire sync interval. A split sync pulse generally refers to a sync interval comprising two or more pulses, i.e., two or more voltage levels between the front and back porch. The desirability of providing split sync pulses and the advantages derived therefrom are fully described in the above referenced copending application. For purposes of illustration, an example of a video signal having a split sync pulse is shown in FIG. 1. It is to be understood that many other embodiments of a split sync signal will be readily apparent to one of ordinary skill in the art.

As shown in FIG. 1, the horizontal sync interval of the video signal comprises two signal portions. The first portion is preferably a pulse having a level at substantially −40 IRE corresponding to the sync tip level. The second portion of the sync interval preferably comprises a pulse having a level of substantially +100 IRE corresponding to the peak white level of the signal. Many other formats for split sync pulses are described in the referenced copending application and it is to be understood that split sync pulses may be used with selectively inverted video or non-inverted video signals and the split sync pulses may themselves be selectively inverted or non-inverted.

As more fully described in the referenced application, a signal transmitted with such a split sync signal has many advantages. For example, if it is desired to scramble the signal by inverting the video portion of the signal, the signal must be reinverted at the receiver and significantly, this inversion and reinversion must occur around the same axis of inversion in both the transmitter (scrambler) and receiver (descrambler). If it is desired to establish an axis of inversion substantially midway between the peak white level (e.g., +100 IRE) and the sync tip level (e.g., −40 IRE), it will be apparent that the axis of inversion should be +30 IRE. This axis of inversion can be calculated in the receiver by averaging the peak level and sync tip level. One way of selectively inverting signals or portions thereof is to produce substantially parallel signal paths in a scrambler comprising, e.g., a non-inverted signal path and an inverted signal path. Since there will be different components in the different signal paths which may introduce an offset of the signal in one path with respect to the signal in another path, it is important to ensure that the selected pulse levels of both the inverted and non-inverted signals produced in the scrambler are accurately calibrated, i.e., at least a portion of one of the signals substantially corresponds to at least a portion of another of the signals. Plural paths may be used in other scrambling applications as well. For example, they may be used to provide various levels of sync suppression.

In the past, scramblers were manufactured and subsequently calibrated in the factory using external calibration instruments known to those of ordinary skill in the art. This calibration was necessary to ensure that corresponding portions of the signals in each of the signal paths occurred at desired levels, e.g., in the case of split sync pulses it may be desired to have the low sync tip and high sync tip levels correspond to −40 IRE and +100 IRE levels respectively. This calibration step adds additional expense and time to the manufacture of scramblers which is obviously undesirable. To carry out this external calibration, the video signal in a non-inverted signal path might be sampled and compared to a video signal from an inverted path and any difference between a predetermined portion of the signals would be corrected.

As will be explained more fully below, the present invention relies on self-calibration. Self-calibration is distinguished from external calibration in that self-calibration is performed by circuitry within the scrambler itself and automatically adjusts at least a portion of one signal to correspond to a portion of another signal without the use of external calibration equipment.

As described in the cross-referenced application, video signals comprising a split sync pulse may be generated by using internally generated voltage levels that are multiplexed with a standard video signal to replace the normally occurring sync signal with an internally generated split sync signal. According to a preferred embodiment of the copending application, the split sync signal may comprise a pulse corresponding to the sync tip level (−40 IRE). It is also disclosed that it is desirable to perform the functions of D. C. clamping and automatic gain control (AGC). It is preferred tha the sync tip level be clamped to the −40 IRE voltage level and then the gain be adjusted so that the back porch level corresponds to the O IRE level. If clamping and gain control do not occur prior to insertion of internally generated split sync pulses, errors can occur if, e.g. the clamped sync tip level is not substantially the same as the internally generated low sync tip level portion of the sync pulse.

SUMMARY OF THE INVENTION

In order to overcome these and other drawbacks of prior art scramblers, it is an object of the present invention to provide a self-calibrating scrambler which avoids the need for factory calibration.

It is another object of this invention to provide encoded and non-encoded signals along plural paths, selectively output one of the signals and self-calibrate the signals along the plural paths.

More specifically, it is an object of this invention to obviate the need for factory calibration of scramblers that are used for producing video signals with split sync pulses.

It is a further object of this invention to provide an improved scrambler for use in producing video signals with split sync pulses that may be scrambled by a variety of known scrambling techniques.

It is a further object of this invention to provide a more efficient scrambler.

It is a further object of this invention to provide a scrambler that may be produced more economically.

It is a further object of this invention to minimize signal errors in a scrambler capable of generating split sync pulses.

It is a further object of this invention to minimize discrepancy between clamped signal levels of signal portions and corresponding internally generated signal portions that are inserted into a scrambled video signal.

Generally speaking, one aspect of the present invention relates to self calibrating a scrambler wherein, e.g., plural signal paths are used to generate various types of signals. For example, if selective inversion of a part of a video signal is desired, there may be a non-inverted signal path and an inverted signal path. The self calibration referred to is the process whereby at least a portion of a signal from one of the plural paths is made to correspond with a corresponding portion of a signal from another of the plural paths. For example, the sync tip level of a first signal on a first path may be made equal to the sync tip level of a second signal on a second path. Additionally, the gain of a first signal may be made equal to the gain of a second signal to self-calibrate the signals.

This self calibration may be implemented in a number of ways which may include comparing corresponding signal portions and using a feedback signal to make one signal correspond to the other signal, clamping a portion of a signal to a corresponding portion of another signal, clamping signals from two separate paths to the same reference level and other techniques that will be readily apparent to one of ordinary skill in the art.

According to another feature of the invention, an incoming video signal may be clamped and gain controlled based on internally generated levels, which levels are also used to generate scrambled video signals including split sync signals.

BRIEF DESCRIPTION OF THE DRAWINGS

FIGS. 6a, 6b, 7a, 7b, 8a, 8b and 8c are a schematic representation of the scrambler according to a preferred embodiment of the present invention.

DETAILED DESCRIPTION OF THE PREFERRED EMBODIMENT

The present invention is not limited to the particular embodiments that will be described below. Rather, one aspect of the invention is broadly defined as self-calibrating signals on plural signals paths of a scrambler. This technique may be implemented in a number of ways and may be used with various types of scrambling (encoding) techniques. For example, the plural signal paths could generate inverted/non-inverted signals; suppressed/non-suppressed signals or various levels of suppression; or broadly speaking encoded/non-encoded signals.

For the sake of clarity, all of these permutations will not be discussed herein. However, the preferred embodiment of using selective inversion/non-inversion of a signal having split sync pulses will be discussed. It will be readily apparent to one or ordinary skill in the art, from a description of the preferred embodiment, how to implement the various other permutations of the present invention.

Figure 1:
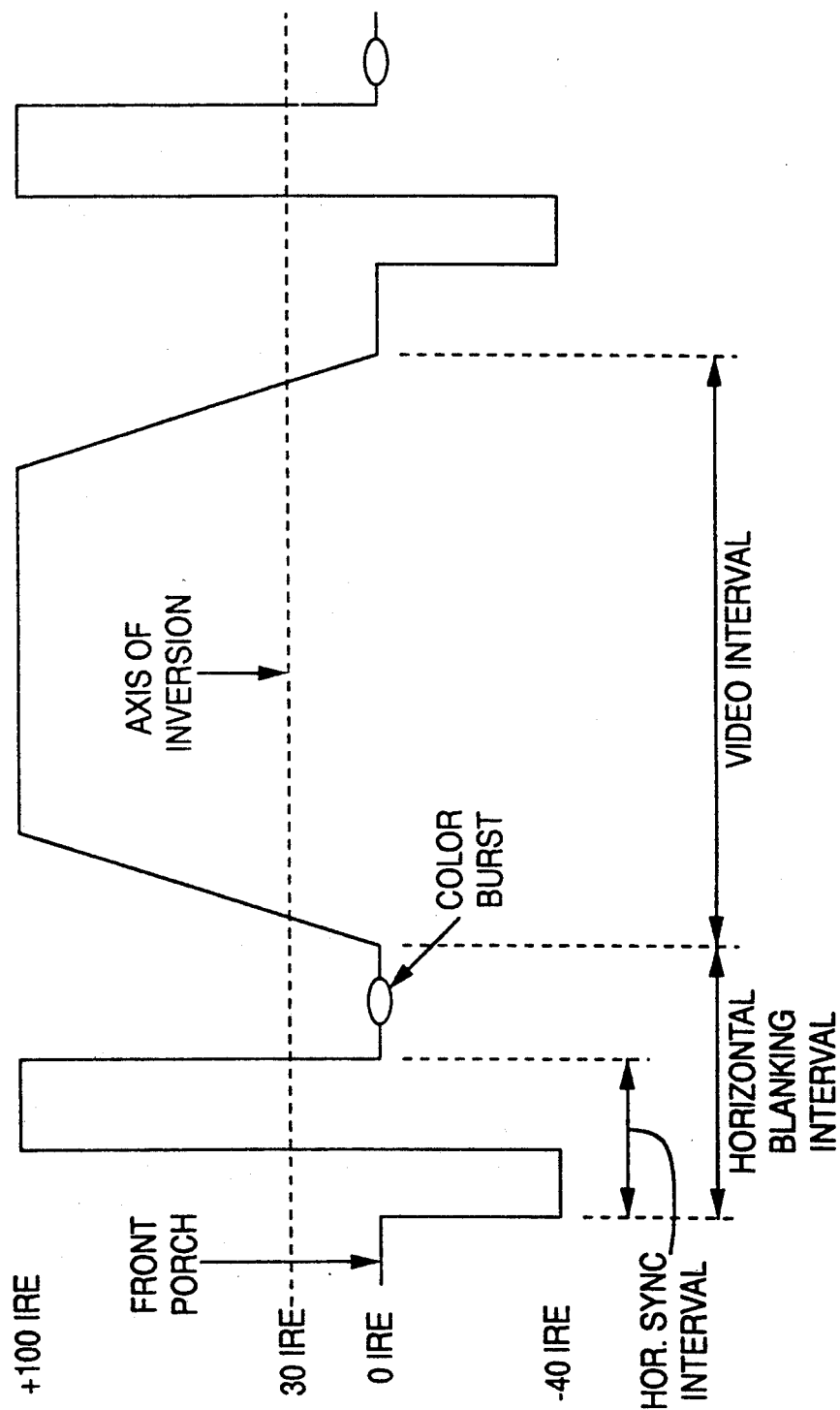
FIG. 1 is a diagrammatic representation of a video signal having a split sync signal.
Figure 2:
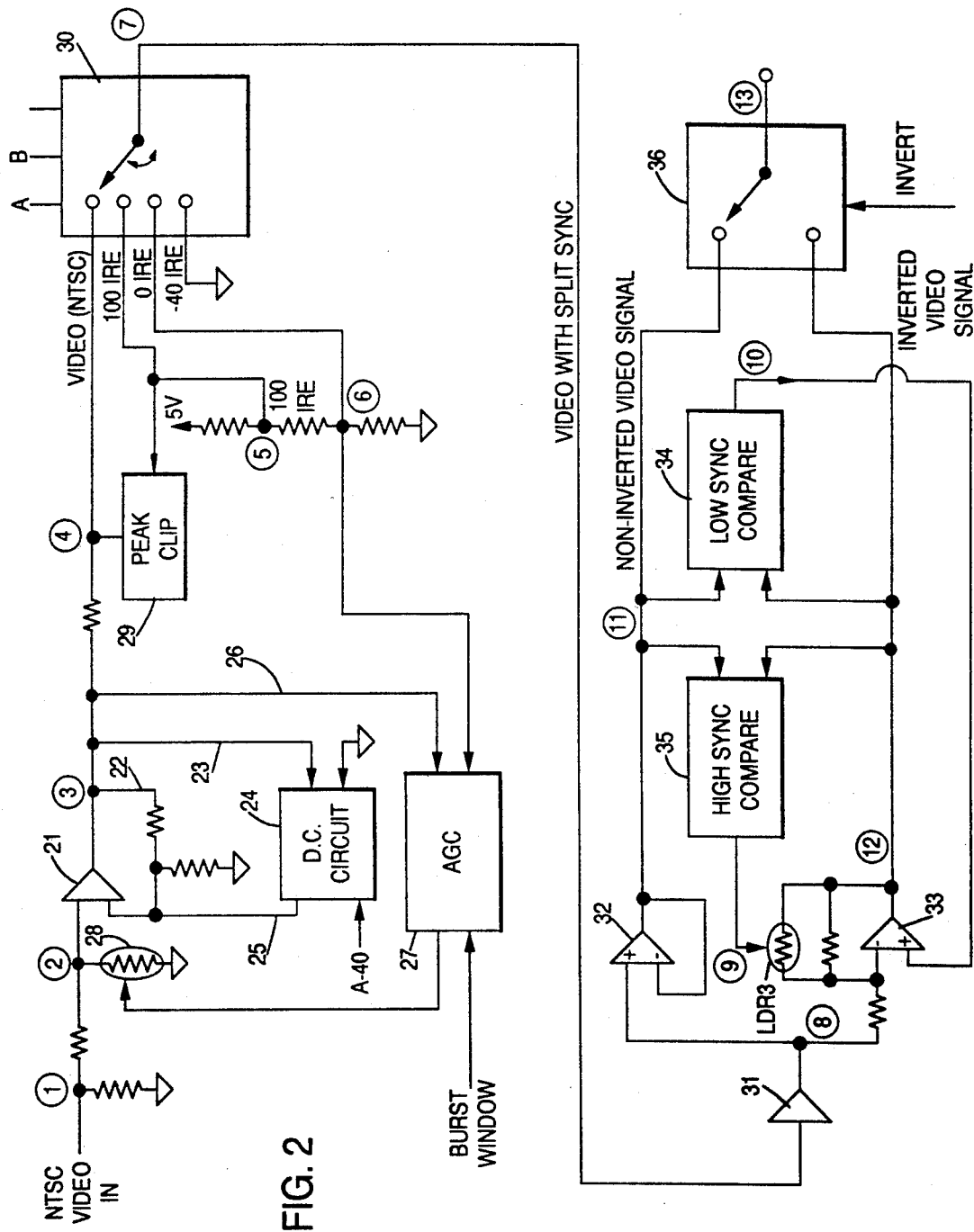
FIGS. 2 and 3 are a block diagram of a scrambler according to a preferred embodiment of the present invention.
Figure 13:
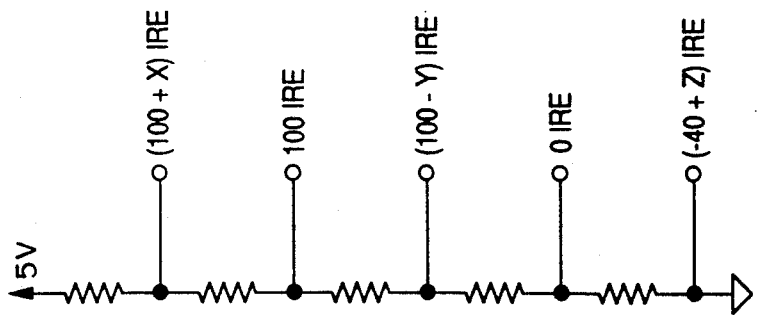
FIG. 13 is an alternative voltage divider circuit.

FIG. 2 is a block diagram of a scrambler according to the present invention. The encircled numbers in FIG. 2 indicate various nodes of the circuit to aid the reader in understanding this embodiment. At node 1, a standard NTSC video signal is input to a scrambler. This signal may be passed through the appropriate signal conditioning circuits and is applied at node 2 to an input of an operational amplifier 21. A portion of the output of operational amplifier is provided along a feedback path 22 and is fed back to an input of the operational amplifier 21. The output of the operational amplifier is indicated by node 3. Another portion of the output of operational amplifier 21 is provided along feedback path 23 to a DC clamp circuit 24. This DC clamp circuit locks the sync tip level to 0 volts. The DC clamp circuit 24 also receives as inputs, a 0 volt signal and a control signal designated as "A-40" which corresponds to a clamp enable signal. The output of the DC clamp is provided along path 25 to an input of operational amplifier 21. Another portion of the output of operational amplifier 21 is provided along feedback path 26 to AGC circuit 27. This AGC circuit performs automatic gain control and provides an output signal to light dependent resistor 28 which is connected between node 2 and ground. The AGC circuit 27 receives an input indicated by BURST WINDOW and an input from node 6 which corresponds to the 0 IRE level of the video signal. The AGC circuit locks the portions of the video signal (at node 3) that are to occur at the 0 IRE level to the voltage at node 6. Node 3 is connected to node 4 through a resistor. Node 4 is connected to a peak clip circuit 29 which performs the function of clipping the video signals or portions thereof that exceed a predetermined reference level. Typically, this reference level may correspond to the 100 IRE level. An input to the peak clip circuit is a voltage tapped from node 5 corresponding to the 100 IRE level of the video signal. The output of node 4 which is a conditioned video signal in NTSC format, is applied as one input to multiplexer 30. Another input to multiplexer 30 is a signal corresponding to the 100 IRE level. Additionally, the multiplexer 30 receives inputs corresponding to a 0 IRE level and a −40 IRE level. The 100 IRE and 0 IRE levels may be generated by a voltage divider network consisting of a voltage source connected to node 5 via a resistor, a second resistor connected between node 5 and node 6, and a third resistor connected between node 6 and ground. (If additional voltage levels are desired, a voltage divider such as the one shown in FIG. 13 may be used to generate any number of voltages at any voltage levels.) The −40 IRE level is preferably a signal corresponding to ground. Multiplexer 30 also receives inputs corresponding to SYNC A and SYNC B timing signals which will be described more fully below. Based on these inputs, there may be produced at node 7 a video signal with split sync pulses similar to the signal shown in FIG. 1.

A more detailed description of how this video signal with split sync pulses is produced is provided in the cross-reference application. However, a brief description will be provided here for clarity. In essence, the output 7 is normally connected to the video signal input. However, during the horizontal blanking interval, e.g., multiplexer 30 connects the output node 7 to either the 100 IRE, 0 IRE or −40 IRE inputs. For example, the output node 7 may be connected through multiplexer 30 to the video input during the portion corresponding to the video interval of the signal. During a blanking interval or reference level, the output may be connected to the 0 IRE level input signal. This may correspond to the breeze-way or front porch interval of the video signal. To generate the synchronization interval, the output 7 may first be connected to the −40 IRE input signal for a period of time corresponding to one-half of the synchronization interval period and for the second half of the synchronization interval period, the output 7 may be connected to the 100 IRE input signal. At the end of the synchronization interval the output node 7 may then again be connected to the 0 IRE input for the back porch interval and then again to the video signal input. By repeating this pattern, video signals with split sync pulses can be internally generated.

The output of multiplexer 30 indicated by node 7 is then applied to the input of emitter follower buffer 31. The output of emitter follower buffer 31 as indicated at node 8 is provided along two signal paths to generate an inverted and a non-inverted video signal. One portion of the output is provided to the positive input of a non-inverting unity gain operational amplifier 32 to generate the non-inverted video signal. The output of this non-inverting amplifier 32 is indicated as node 11. The other portion of the output of emitter follower buffer 31 is provided through a resistor to the negative input of inverting amplifier 33 to generate the inverted video signal. The output of amplifier 33 indicated as node 12 is fed back to a feedback path comprising a resistor connected in parallel to a light dependent resistor indicated by LDR3. For the reasons noted above, it is important that, e.g., the sync levels of the inverted and non-inverted video signals be substantially identical. Therefore, the positive input of amplifier 33 is provided as a feedback signal from node 10 corresponding to the output of a low sync compare circuit 34 which will be described more fully below. A portion of the output of amplifier 33 is also provided as an input to each of a low sync compare circuit 34 and a high sync compare circuit 35. Each of the low sync compare circuit and high sync compare circuit 34 and 35 respectively, also receives an input from node 11 corresponding to the output of amplifier 32. The output of high sync compare circuit 35, indicated by node 9, is provided as an input to the light dependent resistor indicated by LDR3. As will be explained more fully below, this arrangement causes the sync tip levels of the inverted video signal to track the sync tip levels of the non-inverted video signals.

The non-inverted video signal from the output of node 11 is provided as an input to mode select switch 36. Another input to mode select switch 36 is the inverted video signal provided from node 12 corresponding to an output of amplifier 33. Mode select switch 36 also receives a signal indicated as "INVERT" which is used to select an inverted or non-inverted mode of operation to thereby provide an output signal at node 13 corresponding to a video signal having split sync pulses wherein portions of the video signal may be selectively inverted or non-inverted according to a desired operation. A description of the INVERT signal will be provided below.

Figure 3:
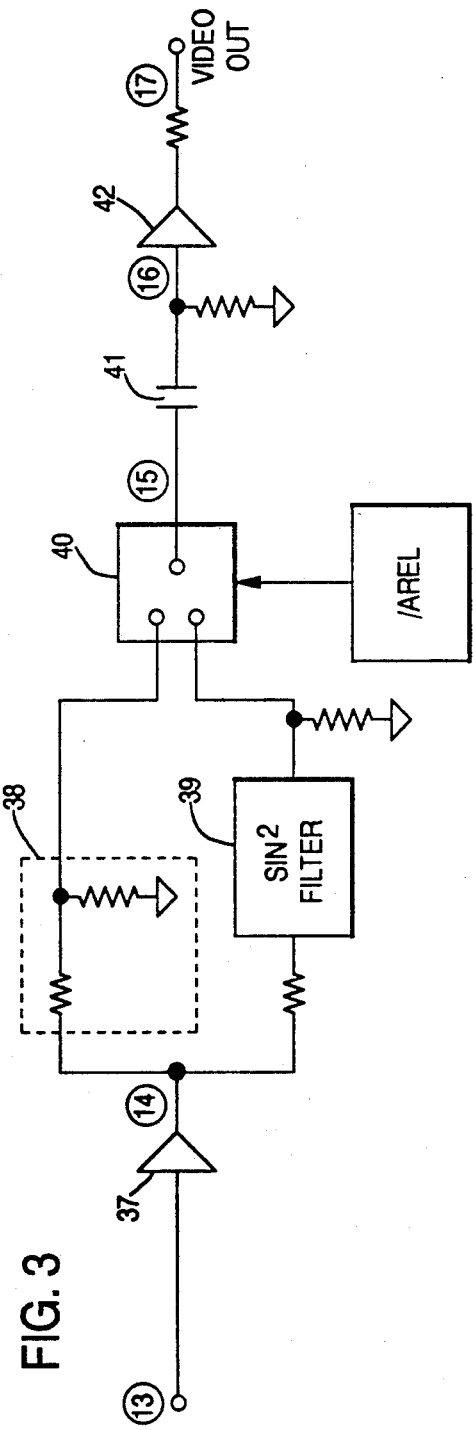

With reference to FIG. 3, it can be seen that the output of mode select switch 36 indicated by node 13 is provided as an input to emitter follower buffer 37. The output of buffer 37 indicated by node 14 is provided along two signal paths. A portion of the output of buffer 37 is provided along a path comprising voltage divider network 38. The output of the voltage divider network 38 is provided as an input to switch 40. Another portion of the output of amplifier 37 is provided to a $SIN^2$ filter 39 and other circuit components including resistors as shown. The output of filter 39 is provided as another input to switch 40. Additionally, switch 40 receives a timing signal indicated by "/AREL," which corresponds to a ring eliminating timing signal. The output of switch 40 is AC coupled through capacitor 41 to an output buffer 42 and is provided as a video output signal.

Figure 5:
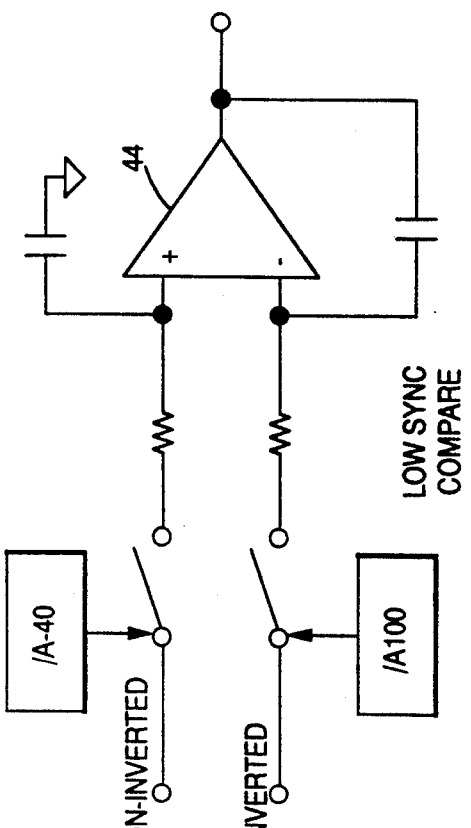
FIGS. 4 and 5 are block diagrams of the High and Low sync comparators of the present invention.
Figure 4:
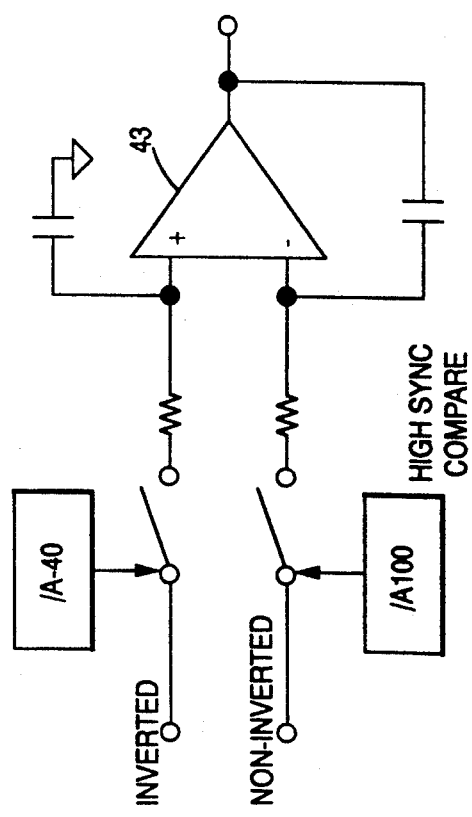

With reference to FIGS. 4 and 5, the low sync compare circuit 34 and high sync compare circuit 35 of FIG. 2 will now be described. FIG. 4 illustrates a preferred embodiment of a high sync compare circuit comprising a gated integrator. As shown, the high sync compare circuit has two inputs, an inverted input and a non-inverted input from nodes 12 and 11, respectively. The non-inverted input corresponds to the output of amplifier 32 of FIG. 2. The inverted input corresponds to the output of amplifier 33 shown in FIG. 2. Each of these inputs is connected through a switch and resistor to an input terminal of operational amplifier 43. The inverted input is applied through a switch which is controlled according to a timing signal corresponding to "/A-40" while the non-inverted input is applied through a switch controlled by a timing signal corresponding to "/A100."

This circuit samples both the reference and the signal to be locked. The difference between them is integrated during the gate window.

Attention is now directed to FIG. 5 and the following description of the low sync compare circuit 34 of FIG. 2. The low sync compare circuit has two inputs, a non-inverted input and an inverted input. The non-inverted input corresponds to the output of amplifier 32 of FIG. 2 while the inverted input corresponds to an output of amplifier 33 of FIG. 2. Each of these inputs is connected through a switch and resistor to an input terminal of amplifier 44. The switch through which the non-inverted input is connected to amplifier 44 is controlled by a timing signal corresponding to "/A-40." The switch through which the inverted input is connected to amplifier 44 is controlled based on a timing signal corresponding to "/A100." Amplifiers 43 and 44 are configured in a known manner as comparators to compare the sync levels of the inverted and non-inverted sync signals. Since the output of these comparators are connected to the feedback paths of amplifier 33 as described above, the inverted video signal with split sync pulses is made to track the non-inverted video signal with split sync pulses thereby self calibrating the system. This circuit operates in a similar manner as that of the high sync compare circuit. Alternatives to the gated integrator approach are disclosed in FIGS. 14 and 15 and the description thereof.

What has been described above is a block diagram illustrating the major components of the present invention presented in a simplified manner to enhance the clarity of the description of the novel features of the present invention. Schematic diagrams of a preferred implementation of the present invention are provided in FIGS. 6, 7 and 8.

Figure 6A:
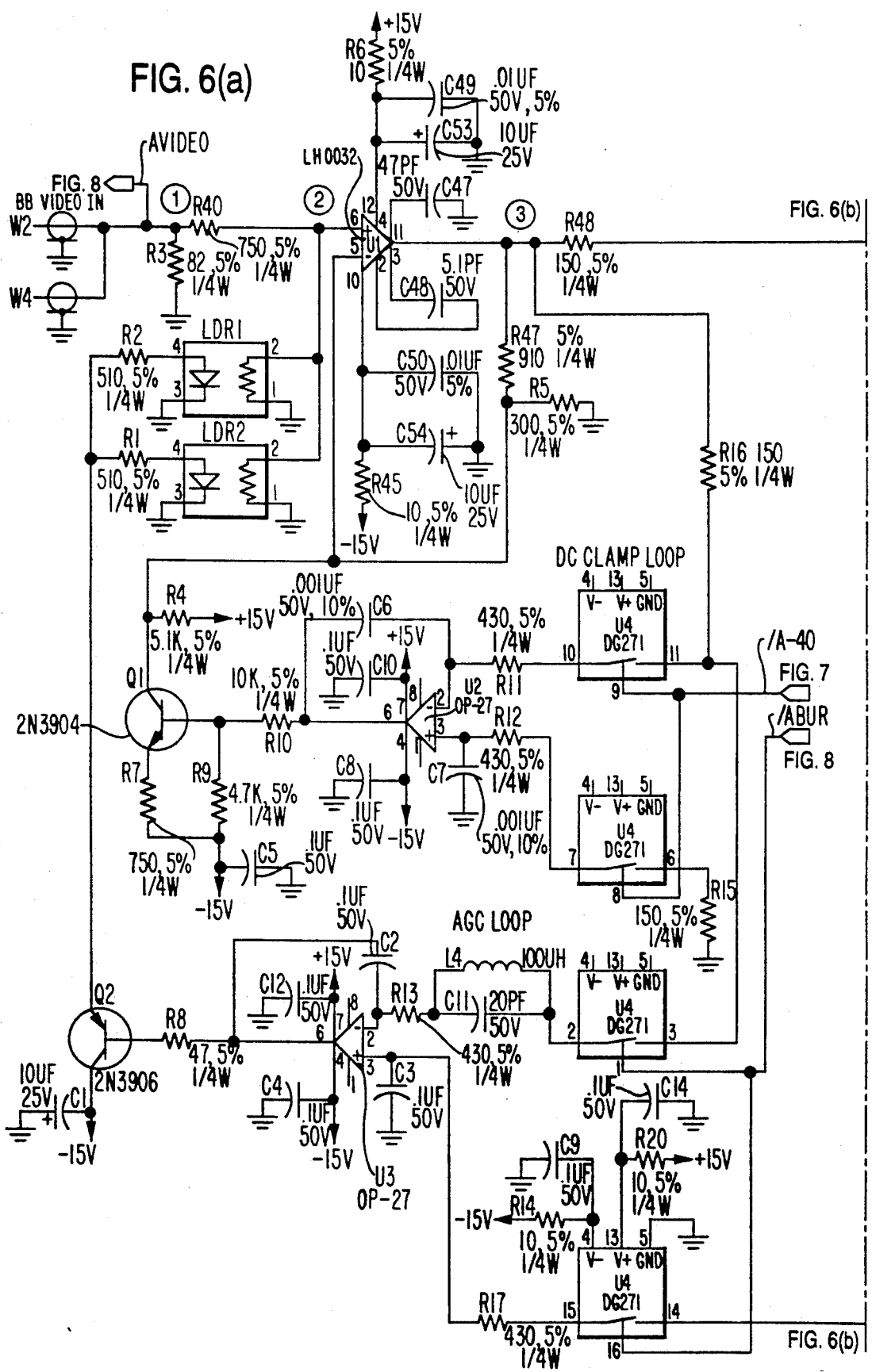

In FIG. 6, op amp U1 corresponds to op amp 21 of FIG. 2. DC CLAMP LOOP corresponds to D.C. Clamp 24 and AGC LOOP corresponds to AGC circuit 27. The /ABUR signal corresponds to "BURST WINDOW." Q3 and Q4 comprise the PEAK CLIP circuit 29. U6 corresponds to multiplexer 30. Nodes 1, 2, 3, 4, 5, 6 and 7 of FIG. 6 correspond to the respective nodes of FIG. 2.

Figure 7A:
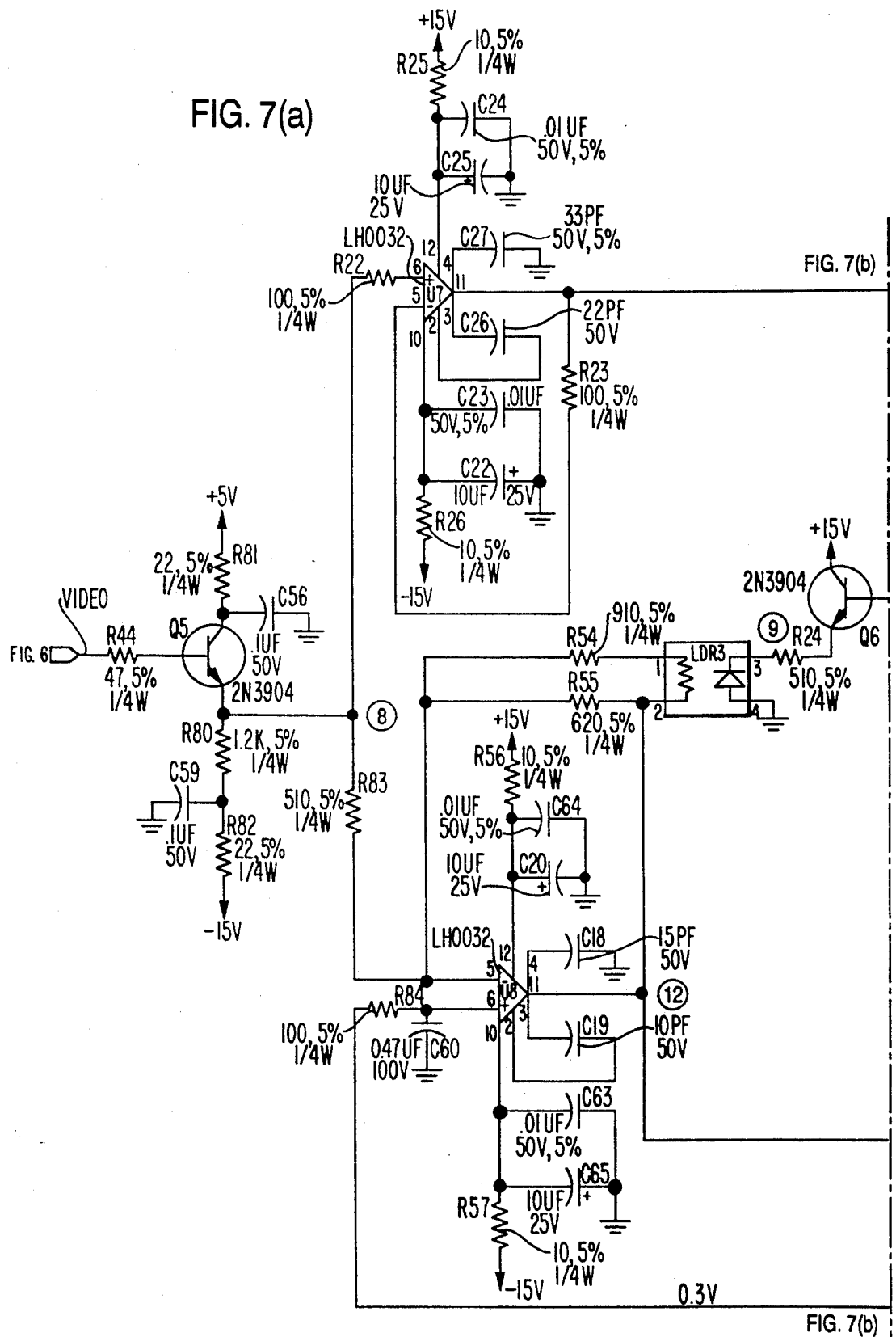
Figure 7B:
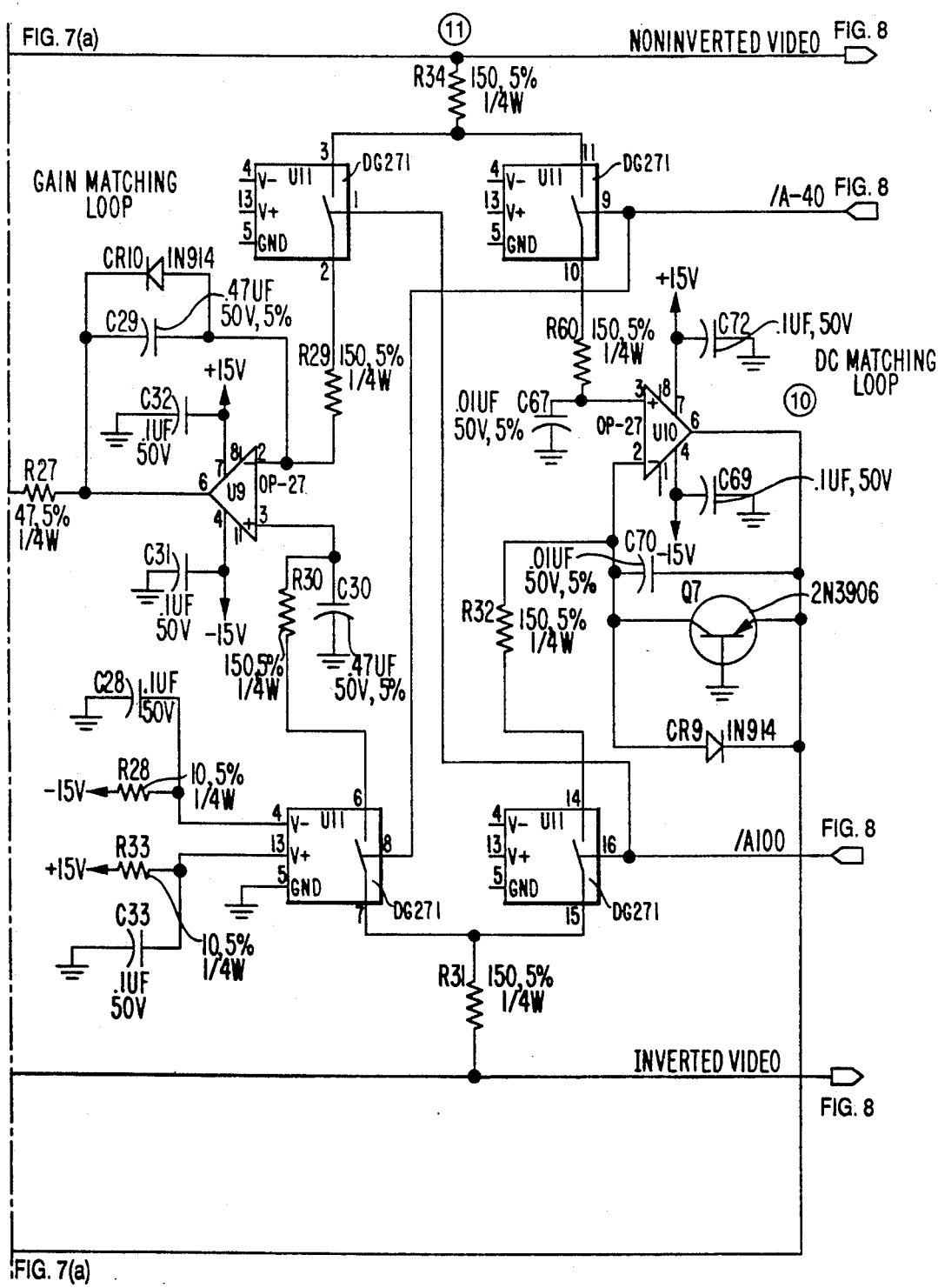

In FIG. 7, Q5 and the associated circuitry corresponds to buffer amp 31 of FIG. 2. U7 and U8 correspond to non-inverting amplifier 32 and inverting amplifier 33, respectively. U9 and U10 correspond to the HIGH SYNC COMPARE circuit 35 and LOW SYNC COMPARE circuit, respectively. Nodes 8, 9, 10, 11 and 12 of FIG. 7 correspond to the respective nodes of FIG. 2.

Figure 8B:
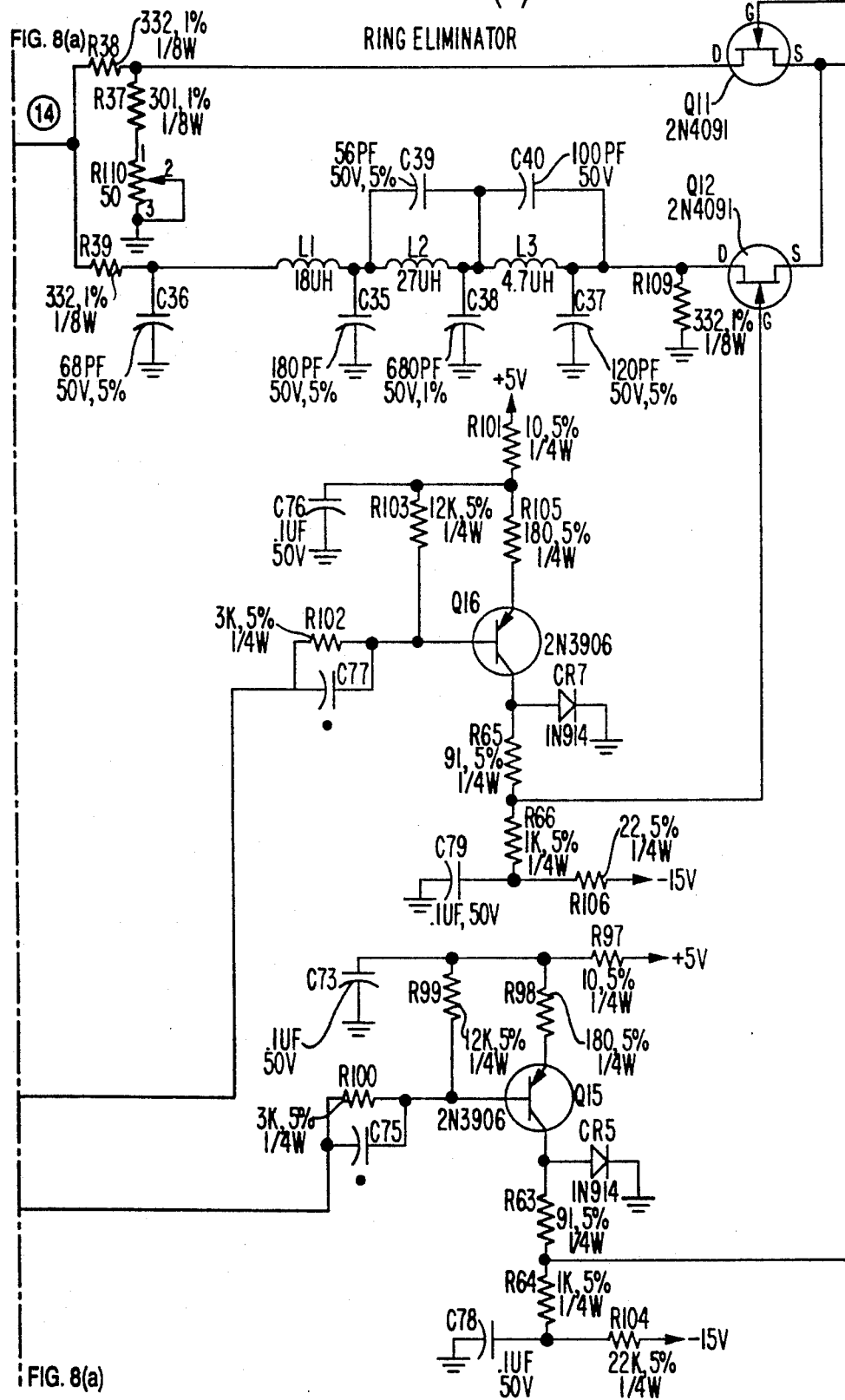
Figure 8C:
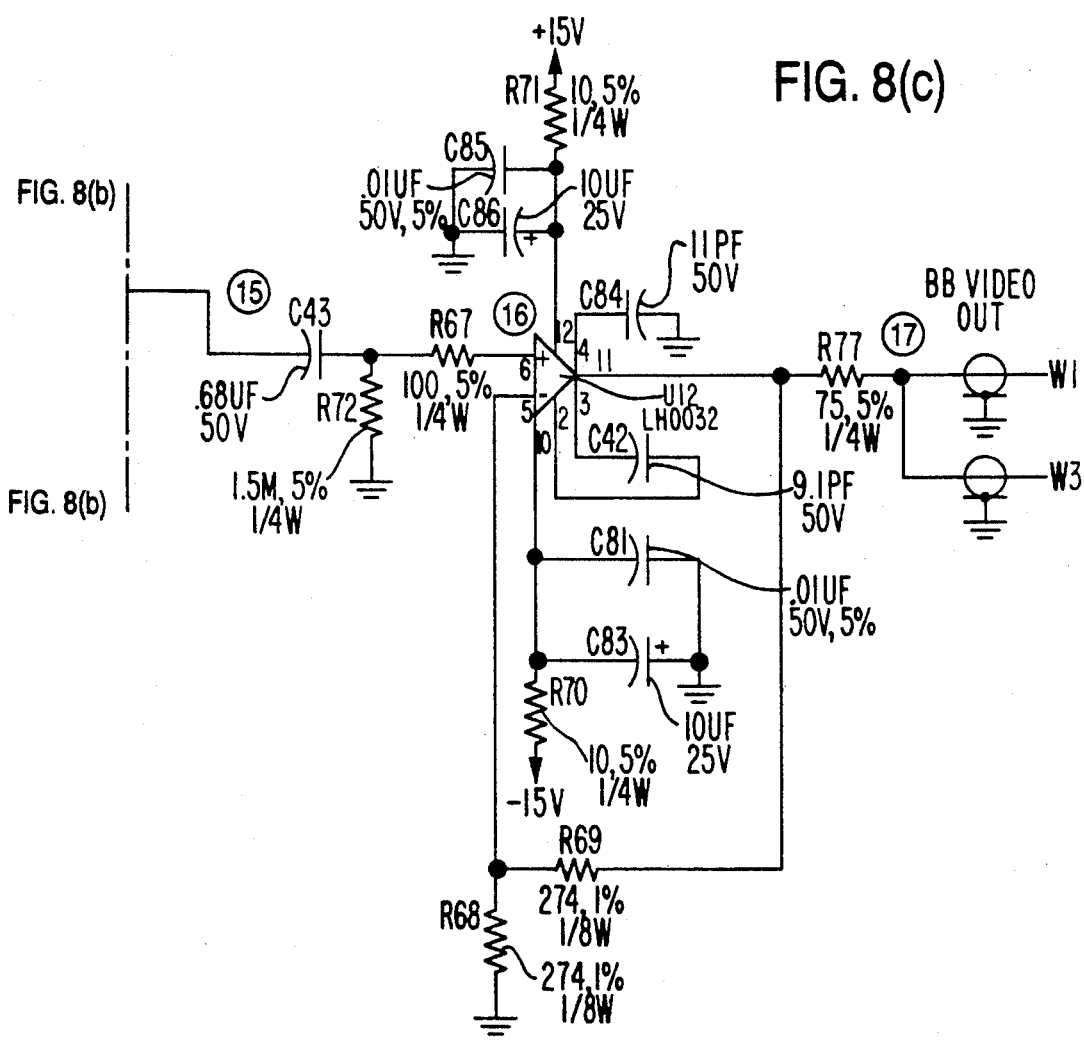

In FIG. 8, Q9 and Q8 correspond to node select switch 36. /AINV corresponds to the INVERT signal applied to switch 36. Q10 corresponds to buffer 37. R38 and R37 comprise resistor network 38 of FIG. 3. L1-L3 and C35-C40 comprise SIN$^2$ filter 39. Q11 and Q12 comprise switch 40 of FIG. 3. U12 corresponds to amplifier 42. Nodes 13, 14, 15, 16 and 17 correspond to the respective nodes of FIG. 3.

The operation of the schematically illustrated circuitry will be readily apparent to one of ordinary skill in the art in view of the discussion of the block diagram of FIGS. 2-5 presented above. However, the High and Low sync compare circuits will be further described.

Figure 9:
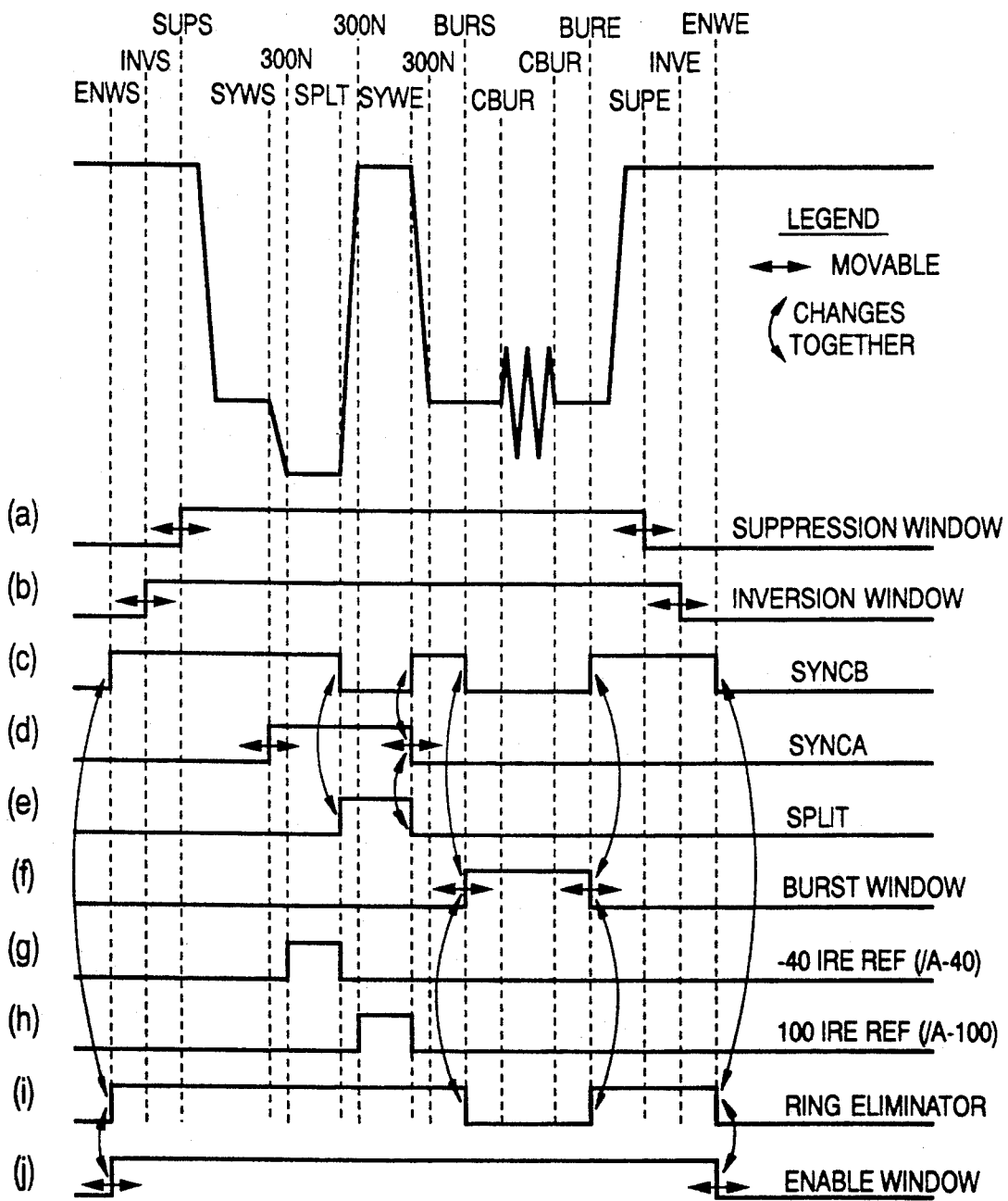
FIG. 9 is a timing diagram illustrating various timing signals that control portions of the circuits of FIGS. 6-8.
Figure 10:
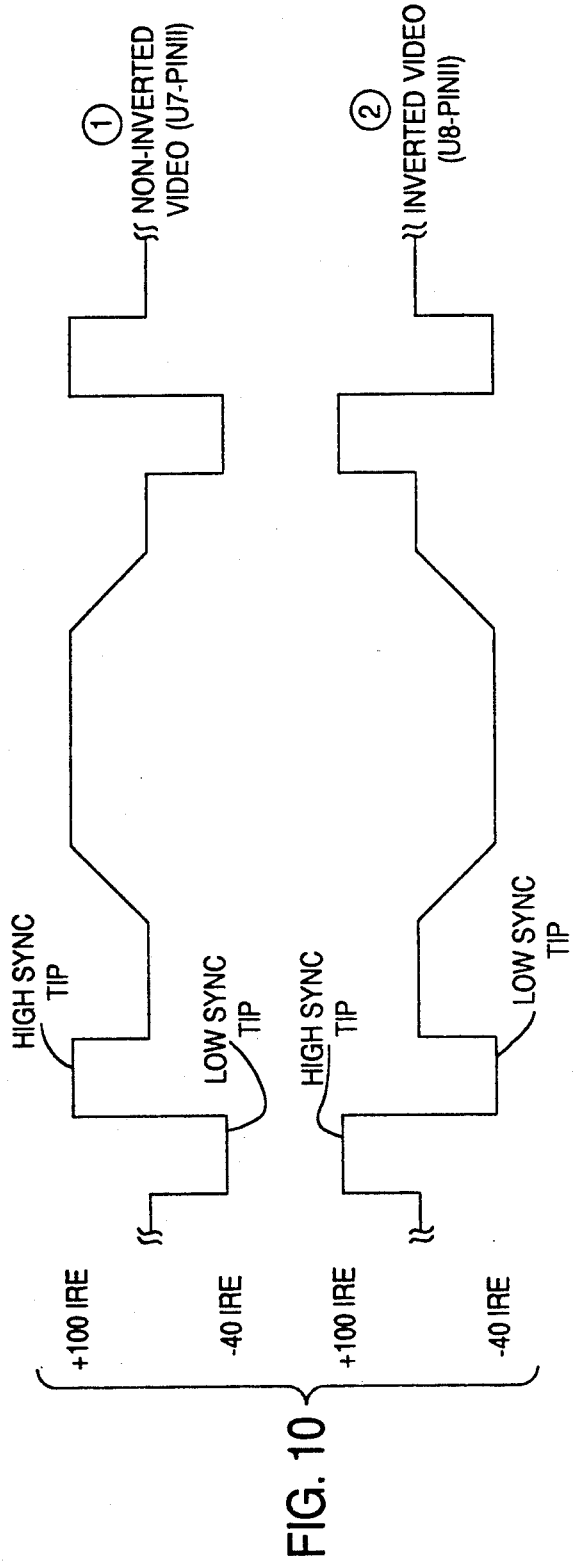
FIG. 10 is a diagrammatic representation of a noninverted and inverted video signal including split sync pulses.

FIG. 10, represents a non inverted video signal as would be found on pin 11 of U7, labeled NONINVERTED VIDEO, in FIG. 7. This signal has already had the split sync signal added in switch U6 (FIG. 6). However, the selective video inversion has not yet been accomplished. Indeed it is the function of the High and Low sync compare circuits to condition the video signal so selective portions of it can be inverted. One object of the circuitry of FIG. 7 is to generate both non inverted and inverted video (present on pin 11 of U7 and U8 respectively) having substantially identical amplitudes and offsets, though of opposite polarity. Inversion is then accomplished by switching between the two video signals at the appropriate times. The switching is accomplished in transistors Q9 and Q8 (FIG. 8). Timing of the switching action is governed by some of the waveforms on the timing diagram, which will be explained below. The object of the High and Low sync compare sample and hold circuits (FIG. 2), is to ensure that the video appearing on the two amplifier outputs are indeed identical in gain and offset, though of opposite polarity. The LOW sync comparator governs the operation of the DC matching. FIG. 10 helps clarify the operation of this loop. The LOW comparator seeks to maintain the −40 IRE level of the two video signals at the same D.C. reference, regardless of offsets in the two video operational amplifiers, U7 and U8. This is accomplished by sampling the −40 IRE level of the two signals, and applying a correction, if required, to one input of amplifier U8. This correction is supplied to pin 6 of U8 through resistor R84. As shown in FIG. 10, the "−40 IRE REF" signal controls operation of two sampling gates, though we only address one of them now. This "A-40 IRE REF" signal is so annotated on the timing diagram of FIG. 9, and is referred to on the schematic by its circuit designation /A-40. With reference again to FIG. 7, the −40 IRE REF (a.k.a. "/A−40") is supplied to switch U11 pin 9, which is closed while the non inverted sync is at the −40 IRE level. This −40 IRE level is stored on capacitor C67. During the last half of the split sync, signal "100 IRE REF" (a.k.a. "/A100") is active. It causes switch U11 pin 16 to close. This connects a −40 IRE level signal from the inverted video, to capacitor C70, which stores that voltage level. Operational amplifier U10 compares the voltage stored on C67, representing −40 IRE of the non inverted video, with that stored on C70, representing −40 IRE of the inverted video. Ideally the two voltages are equal. If not the output from U10 changes. This changes the voltage on pin 6 of inverting operational amplifier U8, in turn changing the output voltage (during the −40 IRE portion of split sync) until it is the same as the −40 IRE voltage of the non inverted video.

In a like manner, the +100 IRE levels of the non inverted and inverted video are sampled respectively by U11 pin 1 and U11 pin 8. Timing of the two samples is controlled again by the −40 IRE REF and 100 IRE REF logic levels, operating on the video at the proper times to recover the +100 IRE level. The two voltages representing the +100 IRE portion of the two video signals, are stored on capacitors C29 and C30 and compared in comparator U9. The output from U9 controls a light dependent resistor, LDR3, which controls the gain of the inverting video amplifier, U8.

To summarize, the amplitude and gain of the inverted and non-inverted video signals are made equal by first adjusting the offset (DC) voltage of one signal until the two match at the lowest voltage level. Then the gain of one signal is adjusted until the two signals are of equal magnitude, determined by measuring their respective peak amplitudes. After it has been assured that the two signals are of identical DC level and gain, they are considered self-calibrated and the self calibrated selectively inverted signal can be composed by switching between these two signals.

It will be readily apparent that the "LOW" circuit operates faster than the "HIGH" circuit, based on the value of the holding capacitors in the two circuits. In the "LOW" circuit, the value of holding capacitors C67 and C70 is 0.01 uF. The value of the holding capacitors in the "HIGH" circuit, C29 and C30, are 0.47 uF, i.e., 47 times larger. Since all four capacitors are charged through like resistances (R 29, 30, 32, 60), the smaller capacitors will charge faster, resulting in faster operation of the "LOW" sampling circuit. For loop stability reasons a significantly faster "LOW" loop than "HIGH" loop is desired. Since the "HIGH" value of the video signal is affected by the "LOW" amplitude, if the two loops operated at about the same speed, the "HIGH" loop could wind up "chasing" the "LOW" loop, resulting in an unstable circuit.

The "LOW" circuit acts as a DC level adjust by changing the voltage on pin 6 of U8, in response to the difference between the −40 IRE level voltages of the two video signals. The voltage output of this amplifier can be shown to be equal to:

$$V_{OUT} = \frac{V_{PIN6}(R_F + R_{83}) - V_{VIDEO}(R_F/R_{83})}{R_{83}},$$

where $R_F = R_{55}$ in parallel with $R_{54} + LDR3$.

Thus, by adjusting the input voltage on pin 6 of U8, its output voltage is correspondingly adjusted. Similarly, the gain is adjusted by changing the value of light dependent resistor LDR3. This can also be seen from the equation.

FIG. 9 is a timing diagram which shows relative timing between various signals shown in the schematic and block diagrams. The upper portion of FIG. 9 depicts a portion of a video signal having a split sync pulse. Above the video signal, there are various symbols which are defined as follows.

1. ENWS—ENable Window Start: At this time the video being processed through the scrambler is switched to go through the ring eliminator SIN² filter to eliminate Gibbs ringing caused by sharp transitions of video inversion processing.

2. INVS—INverting Window Start: At this time the video being processed by the scrambler is brought to 0 IRE to prepare it for processing. Failure to do so will under certain conditions result in an improperly descrambled video signal. Also, at this time the video inversion starts if the sync invert mode is selected. If video invert is selected, this is the time at which the inversion stops. For both of the above cases, this condition will continue until INVE. If either sync suppression or invert all modes is selected, nothing happens at this time.

3. SYWS—SYnc Window Start: This is the time at which the sync pulse starts on the incoming video. It is also the time that the reconstructed sync starts (reconstructed sync is used to generate the split sync signal).

4. 300N (first occurrence)—300 nanoseconds: This is the time required for the sync to transition from 0 IRE to −40 IRE. It is determined by the ring eliminator filter of FIG. 8. This filter is added to restrict the frequencies involved in the split sync pulse otherwise the phenomenon of "Gibbs ringing" may occur. Sampling of the −40 IRE pulse is delayed to make it insensitive to any transients which may exist on the edge of the sync pulse at the sampling point.

5. SPLT—SPLiT. This defines the beginning of the split sync pulse, which is generated by controlling switch IC U6 (top right of FIG. 6).

6. 300N (second occurrence)—300 nanoseconds:

This is the time required to allow the split sync to reach 100 IRE. It is controlled as above. Sampling of the 100 IRE level is delayed with the "100 IRE" signal supra, again to eliminate any sampling errors caused by ringing in the internal circuits.

7. SYWE—SYnc Window End: This is the time at which the split sync signal is ended, and sampling the 100 IRE level is ended.

8. 300N (third occurrence)—300 nanoseconds (again): This is the time required for the sync signal to reach 0 IRE. Nothing is done at this time.

9. BURS—BURSt: At this time the circuit is preparing to transmit the incoming color burst to the output. During most of the horizontal blanking interval we are reconstructing the video waveform, but it is desirable to pass the incoming burst to the output unaffected. So the output, which has been switched to internally generated signals since time ENWS, is switched back to the input. (The output video is connected to internally generated signals whenever either SYNCA or SYNCB is high—see the right side of the timing diagram.) Also, the ring element invert is switched off during this time.

10. CBUR—Color BURst: This designates the time for the color burst on the incoming signal. Nothing is done during this time.

11. BURE—BURst End: At this time, the video is switched back to internally generated signals in preparation for ending the blanking mode and returning to the active video mode.

12. INVE—INVert End: At this time, the output is switched back to the input video, and depending on the scrambling mode, inversion is either begun or ended at this time.

13. ENWE—ENable Window End: At this time, the ring eliminator filter is switched off and the active line begins.

The timing signals of FIG. 9 are described as follows.

1. SUPPRESSION WINDOW: Controls operation of the switched sync suppression part of the scrambler.

2. INVERSION WINDOW: Controls inversion of all or part of the video (active or blanking), depending on the mode of scrambling. This signal appears on FIG. 8 as /AINV, (bottom left). It controls the two transistors switches Q8 and Q9, which select inverted or non inverted video.

3. SYNCB: When high, switch U6 connects the outgoing video to signals generated internally in the scrambler. When low, the incoming video is passed to the output (unless overridden by SYNCA). This signal appears on FIG. 6 (top right).

4. SYNCA: High during the sync tip. This signal appears at the top right of FIG. 6.

5. SPLIT: This signal is part of the logic that makes up SYNC B (FIG. 6, top right). SPLIT controls selection of the 100 IRE level or −40 IRE (ground), selected in U6

6. BURST WINDOW: This signal is used as a sample window for the AGC Loop which comes before the video inversion circuitry. The signal is also involved in calculating /AREL and SYNC (FIG. 8, lower left), in order to transmit the incoming color burst to the output. This signal appears in the middle of FIG. 6.

7. −40 IRE REF(/A-40): Described above for video inversion, this signal is also used as a sample window for the DC clamp loop. It is found in the middle of FIG. 6.

8. 100 IRE REF. Described above.

9. Ring eliminator: Switches in the ring eliminator filter (FIG. 8) when we generate a transition, for which Gibbs ringing must be suppressed. This is shown at /AREL, in the lower left of FIG. 8.

10. ENABLE WINDOW: Defines the times when we substitute internally generated signals for the incoming video (except for the burst time). This signal is part of the make-up of SYNCB.

Figure 11:
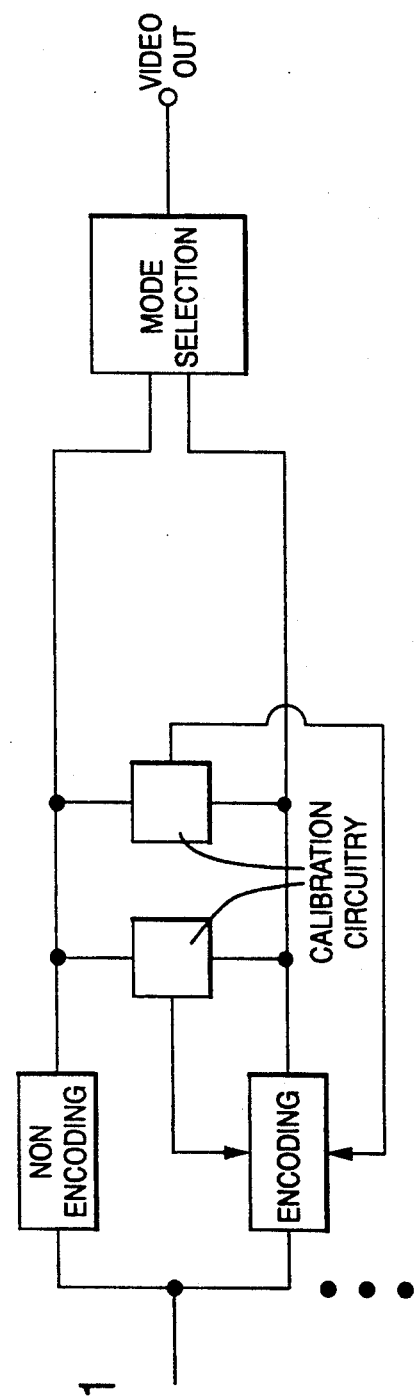
FIGS. 11 and 12 are block diagrams illustrating alternative ways of self-calibrating signals on plural signal paths according to the teachings of the present invention.
Figure 12:
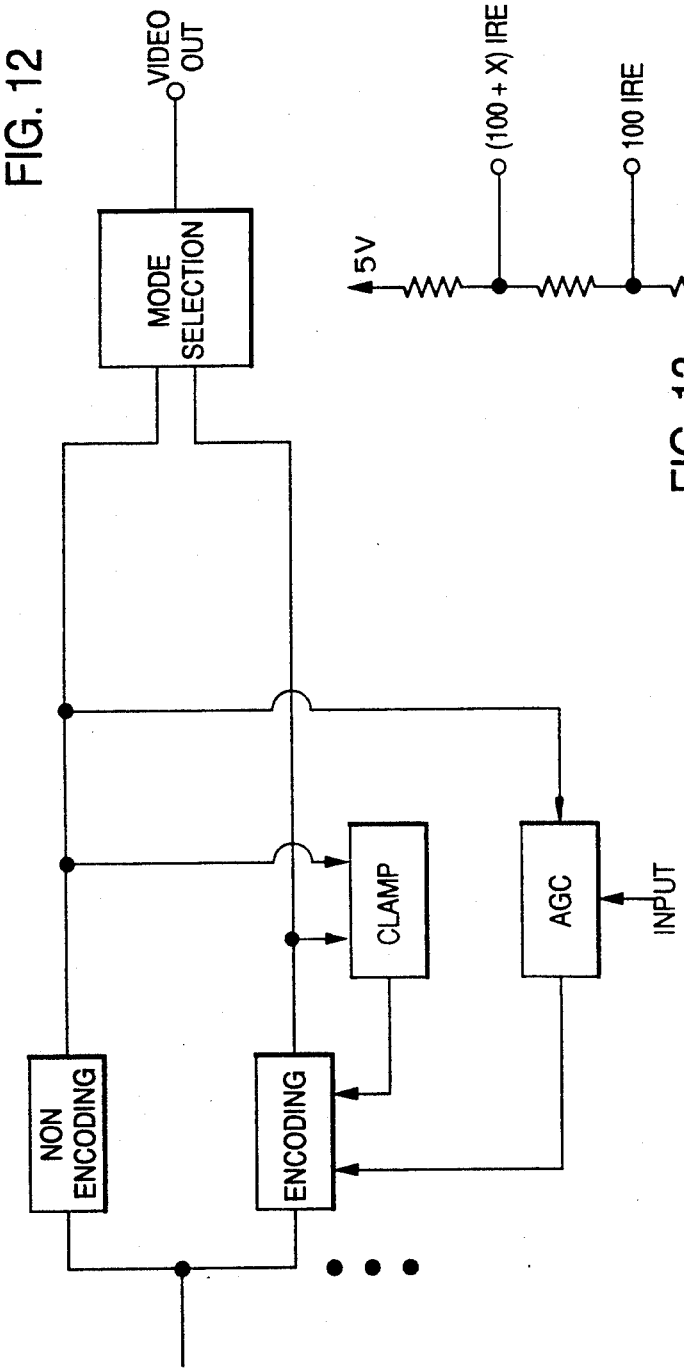

FIGS. 11 and 12 show block diagrams of circuits capable of use in the present invention to self calibrate output signals of plural signal paths. In FIGS. 11 and 12, there is shown at least two signal paths. One path represents an encoded signal path and another path represents a non-encoded path. The nonencoded path contains "non-encoding circuitry" which may comprise for example a unity gain amplifier. The encoded path contains "encoding circuitry" which may comprise circuitry for modifying at least a portion of a signal to thereby effect at least one type of scrambling of the signal provided to the encoded path. Portions of the outputs of the non-encoding and encoding circuitry may be provided to self calibration circuitry to self calibrate the signals.

The encoding may comprise one or more of a number of known encoding techniques including, but not limited to, video inversion, sync inversion, sync suppression including one or more levels of suppression or other encoding techniques that will be readily apparent to one of ordinary skill in the art.

For example, the self calibration circuitry may comprise gated integrators, gated sample and hold devices and/or peak detectors to compare corresponding portions of signals in the plural paths. Outputs of the self-calibration circuitry may be fed back to either or both of the encoding/non-encoding circuitry to self calibrate the signals. Outputs of the encoding/non-encoding circuitry are also provided to a mode select switch to manually or automatically select a desired mode, e.g., non-encoded video out or encoded video out.

In FIG. 12, there is shown an example of self calibration circuitry that may be used in accordance with the present invention. There is shown plural signal paths and appropriate circuitry for each path. Here the self calibration circuitry is shown in the form of clamping and gain control circuitry for clamping a portion of one signal to a value corresponding to a portion of another signal. Alternatively, or in addition to clamping, a gain control operation may be performed to make the gain of a portion of one signal correspond to the gain of a portion of another signal.

For any of the embodiments described herein, it may be desirable to use other internally generated levels. This may be accomplished according to the voltage divider of FIG. 13 which shows levels may be generated above, below, or between 100 IRE and 0 IRE. In this Figure, X, Y and Z are variables such that $(100+X)$, $(100-Y)$ and $(-40+Z)$ are desired voltage levels.

Figure 14:
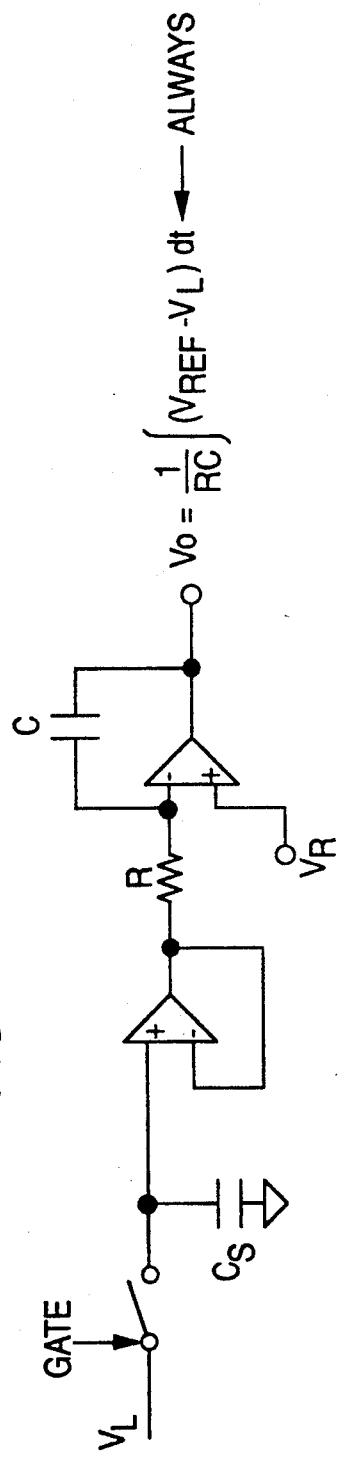
FIGS. 14 and 15 show alternative self-calibration circuitry.

FIG. 14 shows a gated sample and hold device which drives an integrator. In this case, the integrator would be operable substantially all of the time, not just during the sample window.

Figure 15:
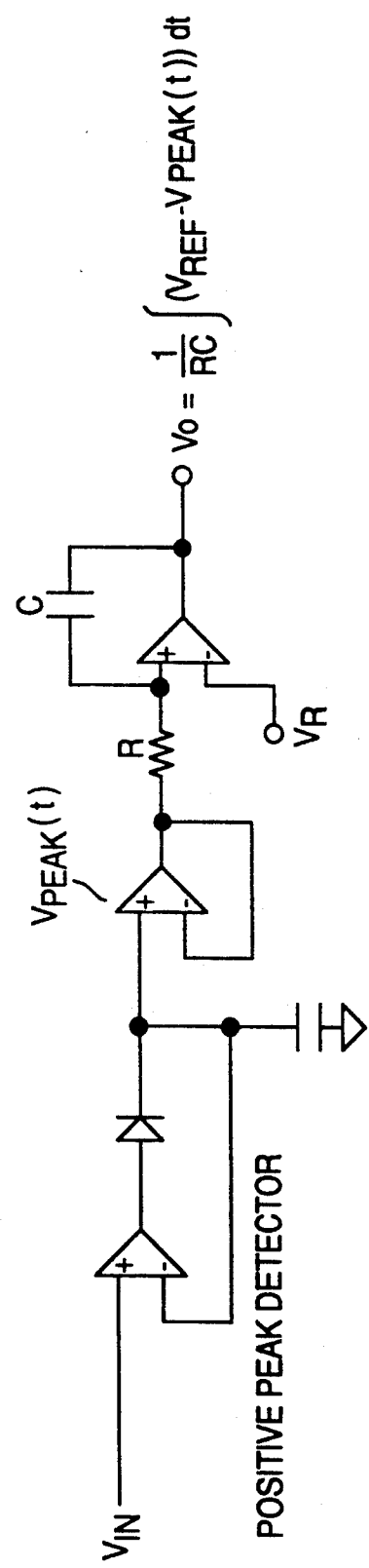

FIG. 15 shows a peak detector to perform the self-calibration. In this embodiment, no gate signal is required but the circuit operates when the "periodic voltages" are at the extremes (e.g., sync tip levels).

Shown in FIG. 15 is a positive peak detector. For a negative peak detector, the diode is reversed.

What has been described is the preferred embodiments of the present invention. Other embodiments will be apparent to one of ordinary skill in the art. For example, even through the preferred embodiment utilizes parallel paths for the encoded/non encoded signals, the present invention could be applied to serial path systems. This invention is not limited to the embodiments described herein but is only limited by the claims appended hereto.

We claim:

1. A scrambler for use in a video system comprising:
   means for simultaneously generating a plurality of video signals each having a video portion and a synchronization portion;
   comparing means for comparing corresponding portions of at least first and second of said plurality of video signals to each other; and
   self-calibrating means responsive to said comparing means for self-calibrating an output of the scrambler based on a predetermined operation involving the synchronization portions of said first and second video signals.

2. The scrambler of claim 1 wherein the synchronization portion of at least the first and second video signals comprises a low sync pulse and a high sync pulse and the self-calibrating means uses the low sync pulse and the high sync pulse to self-calibrate the output of the scrambler.

3. A self-calibrating scrambler for use in a video system, wherein the video system comprises video signals having at least a video signal portion and a synchronization signals portion, the scrambler comprising:
   means for simultaneously generating an inverted signal having at least a portion of the video signal inverted and a non-inverted video signal;
   comparing means for comparing corresponding portions of the inverted and non-inverted video signal to each other; and
   modifying means responsive to the comparing means for modifying one of the inverted or non-inverted video signals to thereby self-calibrate an output of the scrambler.

4. The scrambler of claim 3 wherein the synchronization signal portion comprises a low sync portion and a high sync portion and the comparing means compares the low sync portion of the inverted video signal with the low sync portion of the non-inverted video signal.

5. The scrambler of claim 4 wherein the comparing means compares the high sync portion of the inverted video signal and the high sync portion of the non-inverted video signal.

6. A self-calibrating scrambler for use in a video system wherein the scrambler is capable of producing and selectively outputting inverted and non-inverted video signals, said signals including synchronization signals comprising a low synchronization pulse and a high synchronization pulse, said scrambler comprising:
   means for sampling and holding signals corresponding to the low synchronization pulses of the inverted and non-inverted video signals;
   first comparator means for comparing said low synchronization pulses;
   means responsive to said first comparator means for adjusting a DC level of one of the low synchronization pulses;
   means for sampling and holding signals corresponding to the high synchronization pulses of the inverted and non-inverted video signals;
   second comparator means for comparing said high synchronization pulses; and
   means responsive to said second comparator means for adjusting the gain of one of said video signals.

7. An encoder capable of selectively outputting an encoded or non-encoded signal from one of the plurality of signal paths, comprising:
   means for providing an encoded signal along a first of said plurality of signal paths;
   means for providing a non-encoded signal along a second of said plurality of signal paths simultaneously with said encoded signal;

comparing means for comparing corresponding portions of said encoded and non-encoded signals to each other; and means responsive to said comparing means for making at least a portion of one of said non-encoded signals correspond to a respective portion of the other of said non-encoded or encoded signals.

8. A scrambler for selectively outputting one of a plurality of signals, comprising:

means for simultaneously generating a plurality of signals comprising at least a first signal having a first characteristic and a second signal having a second characteristic;

comparing means for comparing corresponding portions of said first and second signals to each other; and modifying means responsive to said comparing means for modifying one of the first or second signals to thereby self-calibrate an output of the scrambler.

9. The scrambler of claim 8 wherein said means for modifying comprises means for making a portion of said first signal correspond to a portion of said second signal.

10. The scrambler of claim 8 wherein said modifying means comprises:

clamping means for clamping at least a portion of at least one of said first or second signals to a reference level.

11. The scrambler of claim 10 wherein said reference level is generated from a portion of one of said first or second signals.

12. The scrambler of claim 8 wherein said modifying means comprises:

clamping means for clamping a portion of said first signal to a value corresponding to a portion of said second signal.

13. The scrambler of claim 12 further comprising:

gain control means for controlling the gain of a portion of said first signal.

14. The scrambler of claim 13 wherein said gain control means controls the gain of said first signal to correspond to the gain of a corresponding portion of said second signal.

15. A scrambler for selectively outputting one of a plurality signals, comprising:

means for generating a plurality of signals comprising at least a first signal having a first characteristic and a second signal having a second characteristic; and self-calibrating means for self-calibrating said first and second signals, said self-calibrating means comprising a gated integrator.

* * * * *